(12) United States Patent
Kershaw et al.

(10) Patent No.: US 11,175,991 B2
(45) Date of Patent: Nov. 16, 2021

(54) VEHICLE CONTROL SYSTEM HAVING A HIERARCHICAL DISTRIBUTED ARCHITECTURE

(71) Applicant: JAGUAR LAND ROVER LIMITED, Coventry (GB)

(72) Inventors: Charlotte Kershaw, Warwickshire (GB); Christopher Wild, Warwickshire (GB); Mark Grant, Warwickshire (GB); Miguel Lopez, Warwickshire (GB); Francois Loubaresse, Warwickshire (GB); Christophe Fava-Rivi, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 16/311,341

(22) PCT Filed: Jun. 13, 2017

(86) PCT No.: PCT/EP2017/064431
§ 371 (c)(1),
(2) Date: Dec. 19, 2018

(87) PCT Pub. No.: WO2017/220382
PCT Pub. Date: Dec. 28, 2017

(65) Prior Publication Data
US 2019/0205213 A1 Jul. 4, 2019

(30) Foreign Application Priority Data

Jun. 20, 2016 (GB) ..................... 1610727

(51) Int. Cl.
*G06F 11/00* (2006.01)
*G06F 11/14* (2006.01)
(Continued)

(52) U.S. Cl.
CPC ........ *G06F 11/1438* (2013.01); *B60R 16/023* (2013.01); *G06F 9/5077* (2013.01);
(Continued)

(58) Field of Classification Search
CPC ............ G06F 11/2069; G06F 11/0709; G06F 11/0751; G06F 11/3089; G06F 11/3452; G06F 11/3485; G06F 11/3495
See application file for complete search history.

(56) References Cited

U.S. PATENT DOCUMENTS

| 2005/0120160 A1 | 6/2005 | Plouffe et al. |
| 2006/0161637 A1 | 7/2006 | Friess et al. |
| 2012/0246517 A1* | 9/2012 | Bender ............... G06F 11/0712 714/45 |

(Continued)

FOREIGN PATENT DOCUMENTS

EP 2950212 A2 12/2015

OTHER PUBLICATIONS

Search and Examination Report, GB1610727.8, dated Nov. 24, 2016, 6 pp.

(Continued)

*Primary Examiner* — Charles Ehne
(74) *Attorney, Agent, or Firm* — McCoy Russell LLP (57) ABSTRACT

A control system (10) having a hierarchical distributed architecture, the system (10) comprising: a plurality of nodes (12), each node (12) hosting one or more services (18) and a respective node agent (22); a communications bus providing communication between nodes (12); and a system agent (24) hosted on one of the plurality of nodes (12), the system agent (24) being configured to monitor a lifecycle state of the system (10); wherein each node agent (22) is configured to transmit data relating to a state of its respective node (12) and a respective state of the or each service (18) hosted on its respective node (12) to the system agent (24), thereby enabling the system agent (24) to monitor the lifecycle state of the system (10). A vehicle (46) comprising said control system (10).

20 Claims, 4 Drawing Sheets

(51) Int. Cl.
*G06F 9/50* (2006.01)
*G06F 11/30* (2006.01)
*B60R 16/023* (2006.01)
*G06F 9/54* (2006.01)

(52) U.S. Cl.
CPC ...... *G06F 11/3006* (2013.01); *G06F 11/3055* (2013.01); *G06F 9/54* (2013.01); *G06F 2201/805* (2013.01); *Y02D 10/00* (2018.01)

(56) References Cited

U.S. PATENT DOCUMENTS

2013/0211546 A1* 8/2013 Lawson ................ G06F 9/5072
  700/9
2017/0155557 A1* 6/2017 Desai ..................... H04L 43/08

OTHER PUBLICATIONS

Lee, "Product Populations and Life-Cycle Services as Industrial Multi-Agent Systems in an Embedded Electronic, Commerce Framework," Proceedings of the 2nd International Conference on Multiagent Systems, 1996.
Srinivasan et al., "Multi-Agent Systems based Service-Oriented Architecture for Supply Chain Management System," International Journal of Computer Applications, 27:5, 2011.
International Search Report and Written Opinion, PCT/EP2017/064431, dated Oct. 6, 2017, 15 pp.
Gopu, G.L, et al., "Service Oriented Architecture based connectivity of automotive ECUs," 2016 International Conference on Circuit Power and Computing Technologies, IEEE, Mar. 18, 2016.

\* cited by examiner

VEHICLE CONTROL SYSTEM HAVING A HIERARCHICAL DISTRIBUTED ARCHITECTURE

CROSS-REFERENCE TO RELATED APPLICATIONS

This application is a 371 of International Application No. PCT/EP2017/064431, filed Jun. 13, 2017, which claims priority to GB Patent Application 1610727.8, filed Jun. 20, 2016, the contents of both of which are incorporated by reference herein in their entirety.

TECHNICAL FIELD

The present disclosure relates to a control system having a hierarchical distributed architecture. Particularly, but not exclusively, the disclosure relates to a distributed service-oriented architecture for optimized management of a runtime lifecycle for a vehicle control system. Aspects of the invention relate to a control system, a non-transitory computer-readable storage medium, and to a vehicle.

BACKGROUND

Service-oriented architectures (SOA) are widely used in a range of environments, most notably for business workflow management through large distributed IT structures. Cloud-based web services environments are also typically based on SOA principles.

An SOA facilitates the cooperation of software elements in a manner which is described as 'loosely coupled', in which software elements can be managed, installed, upgraded and evolved independently. Several benefits accrue from this approach:
  the ability to update systems in real-time without stopping a critical application;
  the possibility to manage the sourcing of software in an independent and competitive manner;
  improved economics for integration and testing;
  the ability to create new functionality by aggregating the functions of existing software elements; and
  a reduced complexity of system management due to the ability to treat the software elements as well-bounded entities with limited dependencies.

In this context there is a general aim to apply SOA principles to the field of embedded systems, and in particular to automotive control systems. Currently such systems comprise several processing units known as ECUs (electronic control units) connected together by various network technologies, for example using CANbus protocol. The integration of such systems is achieved by the definition of messages on the networks between the ECUs.

In a vehicle environment, ECUs are provided to control various respective subsystems of the vehicle. Subsystems including, for example, a vehicle engine, a transmission, a cruise control system, an anti-lock braking system (ABS), and many others typically have respective dedicated nodes. A modern vehicle may have 70 such nodes or more; and this number continues to rise in the context of a trend towards electrification of vehicles.

This approach is now reaching the limits of its capability in handling new software-based features targeted at modern vehicles. Most notably the automotive industry is facing similar problems with integration and complexity to those that led to the development of the SOA approach in the business IT sphere; hence the interest in applying SOA to this embedded domain.

In the application of SOA it is envisaged that individual vehicle functions will be coded as services and be integrated by an appropriate SOA middleware. As an example, ABS control could be coded as a service and run in the SOA with high safety and priority. In this way the ABS could be individually monitored, updated or tested. The skilled reader will understand that this approach is difficult to implement in current automotive architecture.

One reason for this is the need to have a very fine real-time control of the processing state across automotive systems. This is required for real-time and safety aspects of the vehicle system, and also to allow control of the overall electrical power consumption at any particular moment. The latter point is particularly important for electric and hybrid vehicles, but is also relevant for combustion vehicles.

Currently, in an automotive context, each subsystem of a vehicle control system is developed independently and on differing timescales, and so runtime life cycle management has historically involved implementing a set of global rules which define how the system components behave and interact with each other at a fairly simple and crude level. Within this, the way in which each individual node is configured and implemented into the system differs widely. For example, it is not unusual for a node to limit external visibility to the extent that only the state of the node as a whole is available; no information relating to the states of any internal elements of software hosted is available at a system level. This limits the level of external control that can be applied to the node.

While the historical approach ensures the correct functionality of the overall control system, as interaction between system components is inflexible and tightly constrained the level of control that can be applied to the system as a whole is limited. This can increase the burden on developers when debugging the system, as each node must be debugged individually. Subsequently, during runtime a lack of external visibility of the states of components within each node can create inefficiency within the system, and also compromise the way in which faults are detected and handled.

It is an aim of embodiments of the present invention to address at least some disadvantages associated with the prior art.

SUMMARY OF THE INVENTION

Aspects and embodiments of the invention provide a control system, a non-transitory computer-readable storage medium, and a vehicle as claimed in the appended claims.

According to an aspect of the present invention, there is provided a control system having a hierarchical distributed architecture. The system comprises a plurality of nodes, each node hosting one or more services and a respective node agent. The system further comprises a communications bus providing communication between nodes, and a system agent that is hosted on one of the plurality of nodes, the system agent being configured to monitor a lifecycle state of the system. Each node agent is configured to transmit data relating to a state of its respective node and a respective state of the or each service hosted on its respective node to the system agent, thereby enabling the system agent to monitor the lifecycle state of the system.

By receiving data indicating the status of each node and each service hosted on the nodes, the system agent maintains an overview of the lifecycle state of the system as a whole.

This enables the system to take the lifecycle state into account before control commands such as state change requests are issued, providing a coherent system in which operation of individual software components can be controlled in accordance with the states of other components anywhere within the system. For example, non-critical or idle software components located on one node can be moved into a sleep state to enable resources to be reallocated to components on other nodes for more efficient operation.

Each node agent may be configured to propagate control commands received from the system agent to services hosted on its respective node, thereby maintaining the hierarchical nature of the system architecture.

In some embodiments, each node hosts one or more partitions, in which case each partition may host one or more services and a respective partition agent. In such embodiments, each partition agent may be configured to transmit data relating to a state of its respective partition and a state of each service hosted on its respective partition to its respective node agent. Each partition agent may also be configured to propagate control commands received from its respective node agent to services hosted on its respective node.

Where partitions are used, configuring partition agents to report their states to their respective node agents allows integration of the partitions into the hierarchy of the system architecture in a manner that enables the system agent to maintain complete knowledge of the system state.

The system agent may comprise the node agent of the node on which the system agent is hosted. For example, the functionality of the system agent and the node agent may be encompassed by a single deployment on a node.

The control system may comprise at least one authorised agent that is configured to issue control commands to one or more of the services hosted on the plurality of nodes. In such embodiments, the or each authorised agent is configured to issue control commands in dependence on the data acquired by the system agent from the node agents. The at least one authorised agent may comprise one or more of the group comprising: a user; a watchdog; and a policy handler. The inclusion of authorised agents increases flexibility in control of the system, for example to enable user interaction and control.

The control system may have a service-oriented architecture, which as noted above brings various benefits, including real-time updating, reduced system complexity, and the ability to source, develop and test software components independently.

In some embodiments, for example where a state machine is used to control the system, the control commands comprise state change requests.

The control system may be configured to control a vehicle, in which case each node may relate to a respective subsystem of the vehicle.

Optionally, each node agent is configured to transmit power consumption data and the system is arranged to control the state of the vehicle and to supervise activities and power consumption.

The plurality of nodes, services and node agents may comprise components of the system and, in the event a component fails to initialize, the system agent may be arranged to generate a state change request to transition the system to a shut down state.

The plurality of nodes, services and node agents may comprise components of the system and, in the event a component fails to initialize, the system agent may be arranged to move the system into a pre-configured backup state.

The plurality of nodes, services and node agents may comprise components of the system and the system agent may be arranged to monitor the state of all system components such that, in the event of a failure, the system may either stop and restart a failing function or to start a replacement function, optionally on a different node.

According to another aspect of the invention, there is provided a vehicle comprising the control system of the above aspect.

According to another aspect of the invention, there is provided a non-transitory computer-readable storage medium storing executable computer program instructions arranged to implement the control system as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

For the purposes of this disclosure, it is to be understood that the control system described herein can comprise a control unit or computational device having one or more electronic processors. A vehicle and/or a system thereof may comprise a single control unit or electronic controller or alternatively different functions of the controller(s) may be embodied in, or hosted in, different control units or controllers. As used herein, the term "control unit" will be understood to include both a single control unit or controller and a plurality of control units or controllers collectively operating to provide the required control functionality. The term "module" is likewise intended to include either a single computational module performing a single or multiple functions or a plurality of computational modules performing separable functions. A set of instructions could be provided which, when executed, cause said controller(s) or control unit(s) or module(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g. a non-transitory storage medium) that may comprise any mechanism for storing information in a form readable by a machine or electronic processors/computational device, including, without limitation: a magnetic storage medium (e.g. floppy diskette); optical storage medium (e.g. CD-ROM); magneto optical storage medium;

read only memory (ROM); random access memory (RAM); erasable programmable memory (e.g. EPROM and EEPROM); flash memory; or electrical or other types of medium for storing such information/instructions.

BRIEF DESCRIPTION OF THE DRAWINGS

One or more embodiments of the invention will now be described, by way of example only, with reference to the accompanying drawings, in which.

DETAILED DESCRIPTION

Figure 1:
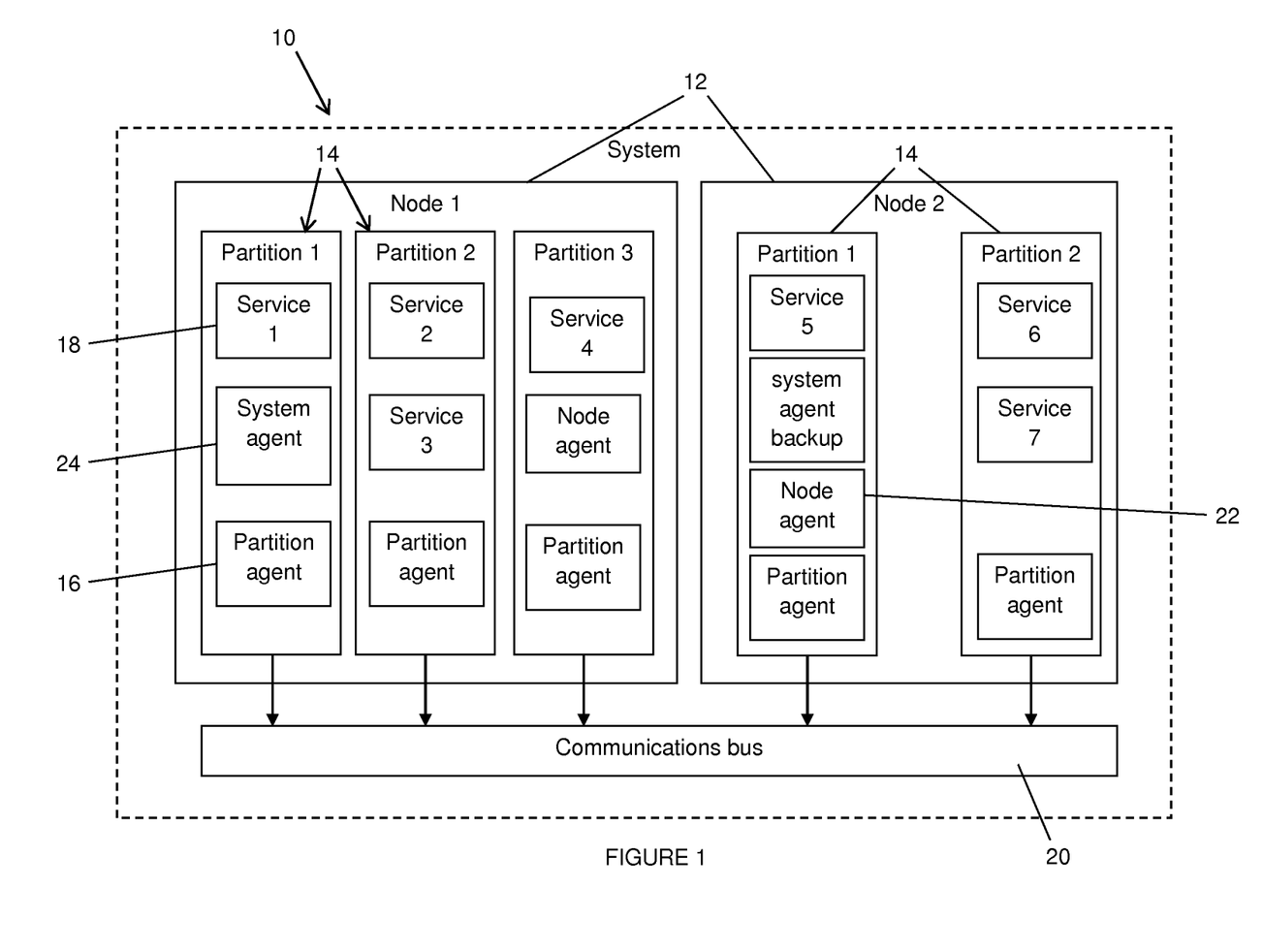
FIG. 1 is a schematic diagram of a service-oriented architecture according to an embodiment of the invention.

FIG. 1 shows in schematic form an instance of a high-level distributed service-oriented architecture for a vehicle control system 10 according to an embodiment of the invention.

The system 10 shown in FIG. 1 includes two nodes 12, each of which corresponds to an individual ECU which controls a respective vehicle subsystem. For simplicity only two nodes 12 are shown; however, it should be appreciated that in practice a vehicle control system typically has many more nodes 12, for example 70 or more as noted above.

Each node 12 has two or more partitions 14, where a partition 14 is a division of the available run-time memory space of a node 12 in a manner that prevents unwanted or dangerous interference between the partitions 14 at run-time. Within the approach described below each partition 14 is managed by a respective partition agent 16. Each partition 14 hosts one or more services 18, each service 18 being configured to perform a function relevant to vehicle behaviour.

The partition agents 16 manage the lifecycle of software running within their respective partitions 14. For example, the partition agents 16 monitor active processes within their respective partitions 14, and in particular monitor the state of each service 18 hosted on the partition. It is noted that monitoring the states of each service 18 entails receiving an update from the service 18 itself. Definitive knowledge of the state of any service 18 rests with the service 18 itself and is not ascertained indirectly, to avoid errors.

Each partition agent 16 also implements control of the services 18 hosted on its partition 14, for example to issue a change of state request to change the state of a service 18 in response to a command issued by other system components.

For the sake of completeness it should be understood that the SOA infrastructure enables each service 18 to communicate with other services 18 wherever they may be located within the system 10. This infrastructure is represented by a communications bus 20 in FIG. 1.

Each node 12 also includes a node agent 22, which is a software component that is arranged to manage the lifecycle of its respective node 12, and which is hosted within one of the node's partitions 14. Each node agent 22 is configured to interface with the partition agents 16 such that it can: (i) track the state of the partitions 14; and (ii) issue state change requests to the partition agents 16.

Within the system 10, one node agent 22 is designated as a system agent 24. The system agent 24 manages the overall lifecycle of the entire system 10 by interfacing with the other node agents 22 in order to: (i) track the states of the nodes 12; and (ii) issue state change requests to the nodes 12. The system agent 24 is also responsible for the node 12 on which it is hosted and in this respect provides the functionality of a node agent 22 by managing the lifecycle of that node 12 in the same way as the other node agents 22 manage their respective nodes 12.

In practice, the functionality of both the system agent 24 and the node agent 22 may be encompassed in a single deployment on the respective node 12, or separate deployments may be used to provide node agent functionality and system agent functionality individually. In either case, constructs representing a node agent 22 and a system agent 24 on the relevant node 12 will be visible to other software components for interfacing purposes.

It is apparent at this stage that the architecture of this embodiment defines a hierarchy between the components of the vehicle control system 10. This hierarchy is shown more clearly in FIG. 2, in which it can be seen that the hierarchy is defined, in upward succession, as: services 18; partition agents 16; node agents 22; system agent 24. In terms of parent-child relationships between entities, the services 18 act as child to parent partition agents 16, which in turn act as child to parent node agents 22, which in turn act as child to parent system agents 24.

Figure 2:
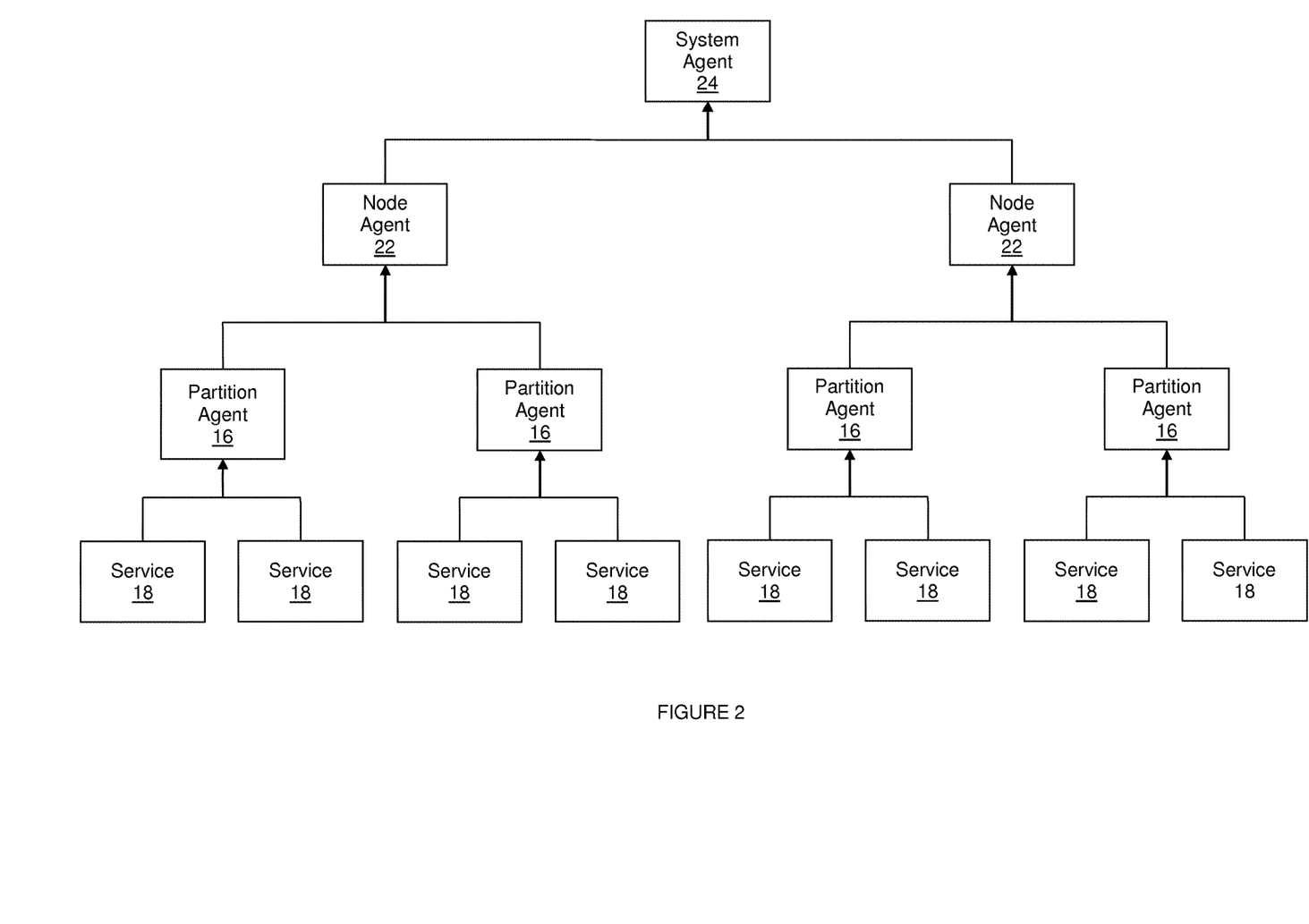
FIG. 2 is a schematic diagram showing a hierarchy between components of the service-oriented architecture of FIG. 1.

It follows that services 18 only have access to their own states, whereas partition agents 16 have access to the state of each service 18 that is hosted on a particular partition 14. Node agents 22 monitor the states of partitions 14, and also the state of hardware associated with the node 12. At the top of the hierarchy, the system agent 24 has access to the states of all system components.

The hierarchical structure of the control system architecture provides complete oversight of all components of the system 10 in a manner that is modular and therefore relatively straightforward to manage. The modular structure also facilitates integration of additional nodes 12 into the system 10, as all that is required is for the new node 12 to take the same form as the others, including the incorporation of a node agent 22, and it can integrate into the system 10 seamlessly. This sits in stark contrast with known systems in which many system components are not visible at a system level, and so cannot be managed at that level, and in which the addition of new components is complex.

The system 10 includes components which are authorised agents that are able to request state changes or status updates for a service 18, partition 14, node 12, or the system 10 as a whole. Authorised agents may include, for example: users, i.e. personnel operating the system 10; watchdogs; and policy handlers. The system agent is also an authorised agent. Any requests generated by such authorised agents are sent directly to the relevant component of the system 10, as described above. The authorised agents have access to the knowledge of the system state and take this information into account when generating requests. This ensures that such requests are handled in harmony with the rest of the system 10, as well as allowing for all requests to be standardised throughout the system 10.

As with most lifecycle management in the computer industry, explicit state machines are envisaged to provide the required control logic in this environment.

Each element of the system 10 cycles through a series of 'states', namely a sequence of operational modes. For example, a typical sequence of states for a service 18 may comprise: initialise; ready; starting; active; stopping; ready; shutting down; not active. Each state defines a specific semantic, which indicates what the service 18 is doing in that state, and the transitions to other states that are possible. This approach also applies to the partitions 14, nodes 12, and system 10.

Following the hierarchy described above it should be noted that the states of the partitions 14, nodes 12 and the system 10 are largely determined by the states of elements which are lower in the hierarchy. As an example, the state of a partition 14 is determined largely by the states of the services 18 within that partition. Hence, it can be assumed that the logic of the state machines closely follows the logic of the control hierarchy provided by the agents.

By standardising in this way, the system 10 facilitates control of the overall state of the vehicle and supervision of activities and power consumption at any given moment. In addition, the development, integration and test of the vehicle are facilitated by the ability to focus on individual elements or collections of elements in a standard manner.

Figure 3:
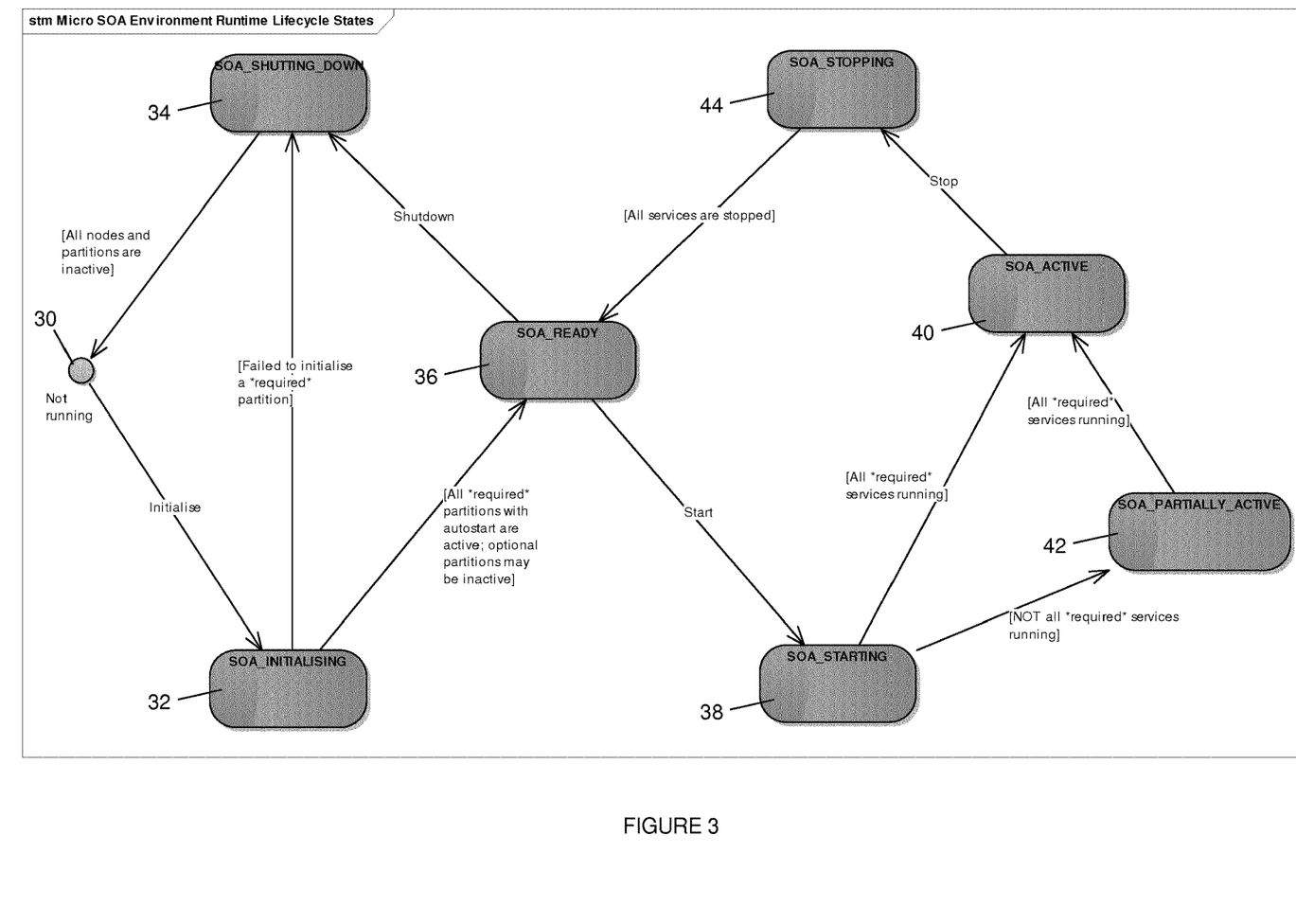
FIG. 3 is a flow diagram showing a sequence of states assumed by a service of the service-oriented architecture of FIG. 1.

FIG. 3 is a state machine diagram showing runtime lifecycle states for the vehicle control system 10 at a system level. It is noted that transitions between states are triggered by state change requests, which in general are generated by the system agent 24 or by other authorised agents, as noted above. For each state transition, changes are propagated from child to parent according to the hierarchy outlined above.

In overview, in the case of starting a system 10 the following flow would result:

1. The system agent 24 initiates a boot by sending an appropriate message to each node agent 22.
2. Each node agent 22 launches the partition agents 16 for each of the partitions 14 required to start on its node 12.
3. Each partition agent 16 launches the services 18 required to start within the partition 14 it controls.
4. Each service 18 when started notifies the partition agent 16 of a successful launch.
5. Each partition agent 16 notifies its node agent 22 on successful launch of all the required services 18 on its respective partition.
6. Each node agent 22 notifies the system agent 24 when all of its partitions 14 have notified it of a successful launch.

This sequence is described in more detail below.

In an initial state 30, shown to the extreme left of FIG. 3, all system components, including all nodes 12 and partitions 14, are inactive. A state change request to initialise the system 10 triggers a change of state, moving the system 10 into the 'initialising' state 32. Typically, for a vehicle control system 10 such a state change request is generated on engine start-up.

If any required components fail to initialise, for example a partition 14 of one of the nodes 12 having essential functionality, a fault is generated and forwarded to a relevant system component which takes action as defined by a system integrator. For example, if the fault is severe the system integrator may require the system 10 to shut down. The system agent 24 enacts this through generating a state change request to transition the system 10 into a 'shutting down' state 34, which completes once all components are inactive. These actions are monitored by the system agent 24 through the relevant node agent 22 and partition agent 16 to maintain a real-time overview of the condition of the system 10.

As an alternative to shutting down the whole system 10, the system agent 24 can be configured to move the system 10 into a pre-configured backup state for certain states when certain lifecycle failures occur. Notably, this relates to a 'limp-home' mode, in which the system 10 must shut down due to a fault condition, but the system 10 has the option to bypass the fault condition by managing system resources to ensure that essential services 18 remain available at the expense of non-essential services 18. This is an area where the architecture of this embodiment provides a significant improvement over known vehicle control systems, because the ability to control any component of the system 10 centrally allows non-essential services 18 to be powered down temporarily, thus freeing system resources for essential services 18 until the system 10 is shutdown successfully. In known systems, limp-home modes are much more difficult to manage.

Returning to the state machine diagram of FIG. 3, if there is no fault during initialisation, once initialisation is complete the system agent 24 generates a further state change request to transition the system components into the 'ready' state 36, which indicates that the system 10 has initialised and awaits further instructions. From this state, the system 10 can either move into an activity cycle, or into the shutting down state 34.

It is noted that the system control is granular and each component can be transitioned into its 'ready' state 36 individually as required, and not necessarily concurrently. It is also noted that one or more 'ready' states 36 are defined at a system level. For each of these, a particular set of system components are initialised while others remain inactive. For example, in one configuration the 'ready' state 36 may be defined as two nodes 12 being initialised while another remains inactive. Successful transition into the 'ready' state 36 for that example therefore entails initialisation of only the two nodes 12 that are required for that configuration.

Typically, the system 10 moves into an activity cycle so that some or all services 18 of the system 10 can become active so as to affect control of vehicle hardware. This entails moving the system 10 into a 'starting' state 38, during which the required services 18 are started. If all required services 18 start successfully, the system 10 moves into an 'active' state 40. If only some of the required services 18 start successfully, the system 10 moves into a 'partially active' state 42, in which those services 18 that started successfully can run, while fault diagnostics are performed to determine which services 18 did not start, and the course of action to take. Once all services 18 are loaded, the system 10 transitions into the 'active' state 40 and continues.

When the services 18 are no longer required, for example when the vehicle is powered down, the system 10 moves into a 'stopping' state 44, in which all services 18 are stopped. Once this is complete, the system 10 returns to the 'ready' state 36, from which the system 10 can either transition back into an activity cycle or, in the case of vehicle shutdown, move into the 'shutting down' state 34 to render all services 18, partitions 14 and nodes 12 inactive.

It is noted that the above state machine relates only to core functions of the vehicle control system 10. Some nodes 12 control hardware that is used intermittently, for example a cruise control system, and so these nodes 12 are activated and deactivated individually outside of, but in harmony with, the sequence shown in FIG. 3, under the control of the relevant authorised agents through the control hierarchy and taking into account the real-time system state. The system agent 24 therefore enables a coherent overall control of the system 10 at all times. This coherent system approach has the benefit that all components of the system 10 can be controlled using standardised semantics and can recognise similar states.

The state machine diagram of FIG. 3 therefore illustrates the system lifecycle in overview and includes two of the operations that are most difficult to manage in known systems: start-up, or system 'boot': and shutdown. As FIG. 3 makes clear, the architecture of this embodiment ensures that all system components remain synchronised and so avoids having some components in conflicting states to others. This refines management and control of the boot and shutdown sequences, which increases the robustness of the system 10, enables more efficient management of system resources, and enhances the ability of the system 10 to detect and handle faults.

Various specific areas in which the architecture described above provides benefits are now described to aid understanding of the functionality of the system 10.

A first example of the benefits of the increased flexibility of control afforded by the architecture of this embodiment is the management of power consumption throughout the system 10. The system agent 24 can monitor power consumption by the various system components and initiate power management actions in situations where power consumption needs to be reduced. Such situations may include, for example, where the system 10 demands too much power from a power source with respect to the capacity of the source, or where there is a risk of damage to or overheating of system components.

With hierarchical lifecycle implemented, the system agent 24 can manipulate power consumption either at a gross level, i.e. by switching off an entire node 12, or at a fine level, for example by stopping a service 18 or set of services 18. In this way, essential services 18 continue running while inessential services 18 are stopped without comprising performance of the system 10.

A second area of benefit relates to fault tolerance, for which the capability to replace a failing function with an alternative function is often desirable. In known systems alternative functions are provided using duplicate nodes 12 running in parallel, creating redundancy in the system. While such solutions are likely to remain necessary for critical real-time functions, for other functions the present architecture offers the ability to: (i) stop and restart a failing function; or (ii) start a replacement function, optionally on a different node 12, without having to restart the entire system 10 or even a node 12. This is because the system agent 24, by monitoring the state of all system components, provides information which precisely identifies the nature of any problems arising within the system 10, and also enables coordination between system components to provide a targeted response. These alternative solutions therefore create the opportunity to reduce hardware requirements for certain functions.

The above described hierarchical lifecycle allows this type of fault correction to be achieved at fine resolution, resulting in reduced perturbation to the overall system 10 while such operations execute. This ensures that systems according to embodiments of the invention have increased resilience and fault tolerance compared with known systems.

As a final example it is noted that there is an increasing demand for systems that can be updated and diagnosed remotely; for example for large deployments of systems or systems that are difficult to access. The hierarchical lifecycle architecture supports a key enhancement of current solutions to this requirement. Specifically, the ability to switch off targeted system components independently of the remainder of the system 10 allows a subset of system features to continue functioning while another subset is being diagnosed or updated.

Figure 4:
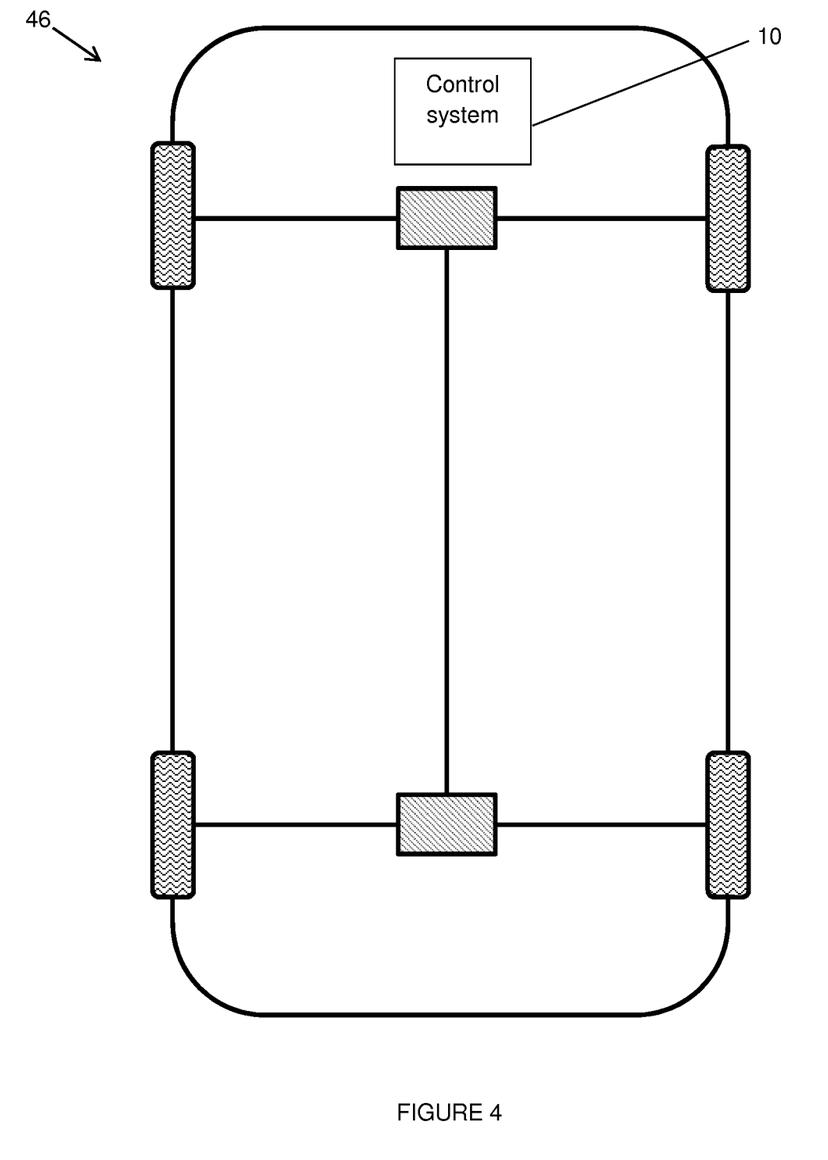
FIG. 4 is a schematic diagram showing a vehicle comprising a control system having the service-oriented architecture of FIG. 1.

As FIG. 4 shows, the invention also extends to a vehicle 46 comprising the control system 10 described above.

Many modifications may be made to the above examples without departing from the scope of the present invention as defined in the accompanying claims. For example, while embodiments of the control systems are described above in the context of an automotive environment, control systems of other embodiments may be applicable to many other types of environment, and in particular to applications where power management is important, such as in aerospace or defence applications where battery powered systems operate in harsh environments, or to applications where high reliability and stability is of benefit.

The invention claimed is:

1. A vehicle comprising a control system having a hierarchical distributed architecture, the control system comprising:
    a plurality of nodes, each node hosting one or more services and a respective node agent;
    a communications bus providing communication between the nodes; and
    a system agent hosted on one of the plurality of nodes, the system agent being configured to monitor a lifecycle state of the system;
    wherein each node agent is configured to transmit data relating to a state of its respective node and a respective state of each service hosted on its respective node to the system agent, thereby enabling the system agent to monitor the lifecycle state of the system, and further wherein each node agent is configured to transmit power consumption data and wherein the system is arranged to control the state of the vehicle and to supervise activities and power consumption.

2. A control system according to claim 1, wherein each node agent is configured to propagate control commands received from the system agent to services hosted on its respective node.

3. A control system according to claim 1, wherein each node hosts one or more partitions.

4. A control system according to claim 3, wherein each partition hosts one or more services and a respective partition agent.

5. A control system according to claim 4, wherein each partition agent is configured to transmit data relating to a state of its respective partition and a state of each service hosted on its respective partition to its respective node agent.

6. A control system according to claim 5, wherein each partition agent is configured to propagate control commands received from its respective node agent to services hosted on its respective node.

7. A control system according to claim 1, wherein the system agent comprises the node agent of the node on which the system agent is hosted.

8. A control system according to claim 1, comprising at least one authorised agent that is configured to issue control commands to one or more of the services hosted on the plurality of nodes, wherein each authorized agent is configured to issue control commands based on the data acquired by the system agent from the node agents.

9. A control system according to claim 8, wherein the at least one authorised agent comprises one or more of a group comprising: a user; a watchdog; and a policy handler.

10. A control system according to claim 1, the system having a service-oriented architecture.

11. A control system according to claim 1, the system being configured to control a vehicle.

12. A control system according to claim 11, wherein each node relates to a respective subsystem of the vehicle.

13. A vehicle comprising the control system of claim 1.

14. A control system as claimed in claim 1, wherein the plurality of nodes, services and node agents comprise components of the system and the system agent is arranged to monitor the state of all system components such that, in the event of a failure, the system is arranged to either stop and restart a failing function or to start a replacement function.

15. A non-transitory computer-readable storage medium storing executable computer program instructions to implement the control system as claimed in claim 1.

16. A control system having a hierarchical distributed architecture, the control system comprising:
a plurality of nodes, each node hosting one or more services and a respective node agent;
a communications bus providing communication between the nodes; and
a system agent hosted on one of the plurality of nodes, the system agent being configured to monitor a lifecycle state of the system;
wherein each node agent is configured to transmit data relating to a state of its respective node and a respective state of each service hosted on its respective node to the system agent, thereby enabling the system agent to monitor the lifecycle state of the system, and further wherein the plurality of nodes, services and node agents comprise components of the system and further wherein, responsive to a component failing to initialize, the system agent is arranged to generate a state change request to transition the system to a shutdown state.

17. A control system according to claim 16, wherein each node agent is configured to propagate control commands received from the system agent to services hosted on its respective node.

18. A control system according to claim 16, comprising at least one authorised agent that is configured to issue control commands to one or more of the services hosted on the plurality of nodes, wherein each authorized agent is configured to issue control commands based on the data acquired by the system agent from the node agents.

19. A vehicle comprising the control system of claim 16.

20. A control system having a hierarchical distributed architecture, the control system comprising:
a plurality of nodes, each node hosting one or more services and a respective node agent;
a communications bus providing communication between the nodes; and
a system agent hosted on one of the plurality of nodes, the system agent being configured to monitor a lifecycle state of the system,
wherein each node agent is configured to transmit data relating to a state of its respective node and a respective state of each service hosted on its respective node to the system agent, thereby enabling the system agent to monitor the lifecycle state of the system, and
wherein the plurality of nodes, services and node agents comprise components of the system and further wherein, responsive to a component failing to initialize, the system agent is arranged to move the system into a pre-configured backup state in which non-essential services are powered down to free system resources for essential services.

* * * * *